July 20, 1965

D. E. BRADFORD 3,196,141

RECOVERY OF SOLIDS FROM A LIQUID-SOLIDS SLURRY

Filed Aug. 6, 1962

INVENTOR.
D. E. BRADFORD

BY *Young and Quigg*

ATTORNEYS

United States Patent Office 3,196,141
Patented July 20, 1965

3,196,141
RECOVERY OF SOLIDS FROM A LIQUID-SOLIDS SLURRY
Dale E. Bradford, Pasadena, Tex., assignor to Phillips Petroleum Company, a corporation of Delaware
Filed Aug. 6, 1962, Ser. No. 215,150
5 Claims. (Cl. 260—93.7)

This invention relates to the recovery of solids from a liquid-solids slurry. In one aspect, the invention relates to the separation of solid polyolefin fines from a diluent. In another aspect, the invention relates to a method and apparatus for the continuous removal of settled solids or sediment from a sedimentation vessel.

It is well known to remove solids from a liquid-solids slurry by continuously introducing said slurry into the upper portion of a vessel, permitting the solids to gravitate from said liquid and removing a substantially solids-free liquid from the upper portion of said vessel. However, heretofore, these operations have either been batch operations which must be periodically shut down so that the sediment can be removed therefrom or else complicated auger or conveyor systems or the like must be installed in the lower portion of the settling vessel so as to continuously remove the solids.

It is an object of the invention to provide an improved method and apparatus for the recovery of solids from a liquid-solids slurry.

Yet another object of the invention is to provide an improved method and apparatus for the separation of solid polyolefin fines from a diluent.

Yet another object of the invention is to provide an improved method and apparatus for the continuous removal of sediment from the lower portion of a settling zone.

These and other objects of the invention will be readily apparent to those skilled in the art from the accompanying disclosure, drawing and appended claims.

These objects are broadly accomplished in a process comprising introducing a slurry of liquid containing solids into a settling zone wherein the solids gravitate toward the lower portion of said zone and removing substantially solids-free liquid from the upper portion of said zone by the improvement comprising method and apparatus for introducing into a lower portion of said zone adjacent one end portion a fluid immiscible with and having a specific gravity greater than said liquid and solids resulting in two liquid phases and an interfacial layer between said phases wherein said settled solids accumulate and removing said interfacial layer containing solids from said zone.

In one embodiment of the invention, a series of partitions or weirs in the lower portion of said zone are provided which have a gradually receding height toward the end of removal of the interfacial layer so as to gradually reduce stepwise the level of said layer.

In another embodiment, the depth of the mixture of fluids and solids flowing over each individual weir is identical for each weir and said depth is controlled by adjusting the amount of fluid introduced into the lower portion of said zone.

This invention is broadly applicable to the removal of solids from a liquid-solids slurry. In order to simplify the discussion, the invention will be discussed with specific reference to the recovery of solid polyolefin fines from a slurry thereof in a liquid diluent.

A number of methods have been proposed for the preparation of solid polyolefins. One particularly suitable method is disclosed in a patent to Hogan et al., U.S. 2,825,-721 wherein it is disclosed that polymers and copolymers can be produced by contacting one or more olefins with a catalyst comprising as an essential ingredient chromium oxide, preferably including a substantial amount of hexavalent chromium, associated with at least one other oxide particularly selected from the group consisting of silica, alumina, zirconia and thoria. The olefin feed used for the polymerization is at least one olefin selected from 1-olefins having a maximum of 8 carbon atoms per molecule and no branching nearer the double bond than the 4-position. Examples of olefins which can be polymerized by the described method include ethylene, propylene, 1-butene, 1-pentene and 1,3-butadiene. Copolymers, such as ethylene-propylene copolymers and ethylene-butadiene copolymers, can also be prepared by utilizing the chromium oxide containing catalyst. The olefins are polymerized in the presence of a hydrocarbon diluent, for example, an acyclic, alicyclic or aromatic compound which is inert.

Recently it has been discovered that it is possible to produce increased yields of high molecular weight polymers of olefins which are insoluble in the hydrocarbon diluent. This polymer is formed in association with the polymerization catalyst and is suspended in the liquid diluent in solid particle form. A method for the preparation of insoluble particle form polymer is disclosed in the copending application of Leatherman et al., Serial No. 590,567, filed June 11, 1956. Reference is hereby made thereto. In the following discussion, the term "particle form polymer" will be employed to designate the insoluble polymers of olefins, including those formed in accordance with the Leatherman et al. application.

Particle form polymer can be prepared from olefins and from mixtures of olefins, preferably ethylene or propylene or mixtures thereof or ethylene or propylene with other unsaturated hydrocarbons, for example, mixtures of ethylene with minor amounts of higher 1-olefins, such as propylene, 1-butene, 1-pentene, 1-hexene, and the like. Examples of comonomers which can be used with ethylene and propylene include 1-olefins having no branching nearer the double bond than the 4-position and conjugated and nonconjugated diolefins. The polymerization reaction is carried out in the presence of a liquid hydrocarbon diluent which is inert in the polymerization reaction and in which the majority of the polymers is insoluble under reaction conditions. Suitable diluents include paraffins such as those having from 3 to 12 and preferably 3 to 8 carbon atoms per molecule, for example, n-butane, n-pentane, isopentane, n-hexane, n-decane, etc., saturated cyclic hydrocarbons such as cyclohexane, cyclopentane and methylcyclopentane, methylcyclohexane, etc. The polymerization reaction temperature will vary depending on the particular liquid diluent which is employed and on the olefin reactants. Usually, however, polymerization is carried out at 230° F. and below, preferably between about 225° F. and about 150° F. The olefin reactants are contacted in the polymerization zone with a suspension of subdivided chromium oxide catalyst in the liquid hydrocarbon diluent under the aforementioned temperatures and under pressures suitable to maintain the diluent in the liquid phase. Concentration of the catalyst in the reaction zone can vary widely; however, generally it will be in the range of 0.001 to 5 percent by weight based on the liquid hydrocarbon diluent.

Subsequent to the removal of the polymer from the reaction zone and the removal of unreacted monomers and separation of catalyst, if necessary, the polymer must be separated from the solvent or diluent as the case may be. If the polymer is produced in solution, such as polyolefin in cyclohexane, at elevated temperatures then the polymer is precipitated from solution, such as by the injection of the solution into water or by a reduction in temperature. In either case, that is whether the polymer is produced as a solution or as a particle form polymer in a liquid diluent, the next step is generally the separation of solvent or diluent from the solid polymer. This is frequently accomplished by introducing the slurry of solid polymer and diluent, which may include water, into a steam stripper or other liquid-solids separation means such as a centrifuge or filter. This separation step can also be accomplished by the apparatus of this invention so as to remove the bulk of the solvent before steam stripping. In either case, the overhead contains a considerable portion of very fine polymer solids, usually less than 1 weight percent, which are generally considered as waste material. The solvent or diluent is then frequently recycled to the reaction zone or to other process steps. However, it is considered advantageous to remove these polymer fines since they are detrimental to the operation of the pumps and the like and deposit on the interior walls of the equipment eventually completely plugging the conduit, particularly at bends. Therefore, it would be advantageous to provide method and apparatus for the economical removal of said polymer fines.

It is well known to introduce a slurry of liquid-solids into a sedimentation zone, such as a cylindrical open or closed tank, of sufficient length and diameter to provide a quiescent zone in the lower portion thereof and to permit the solids to gravitate toward said lower portion with the substantially solids-free liquid being removed from an upper portion of said zone at a point not adjacent to the point of introduction of said slurry. These sedimentation vessels are generally batch operations or require augers or other conveying means of intricate design to permit the removal of the solids.

It has now been found that by introducing a liquid which is immiscible with the diluent or solvent and also has a specific gravity greater than either said diluent or solvent or solids that an interfacial layer will be formed at the juncture of the two liquid phases which contains substantially all of the gravitated solids. By providing a plurality of weirs or partitions in the lower portion of the settling vessel, each succeeding weir being of slightly less height than the preceding weir, it is possible to reduce the plane or level of the interfacial layer gradually so as to ultimately coincide with the point of withdrawal of said interfacial layer.

The invention is best described with reference to the accompanying drawing and specific embodiment.

Figures 1, 2:
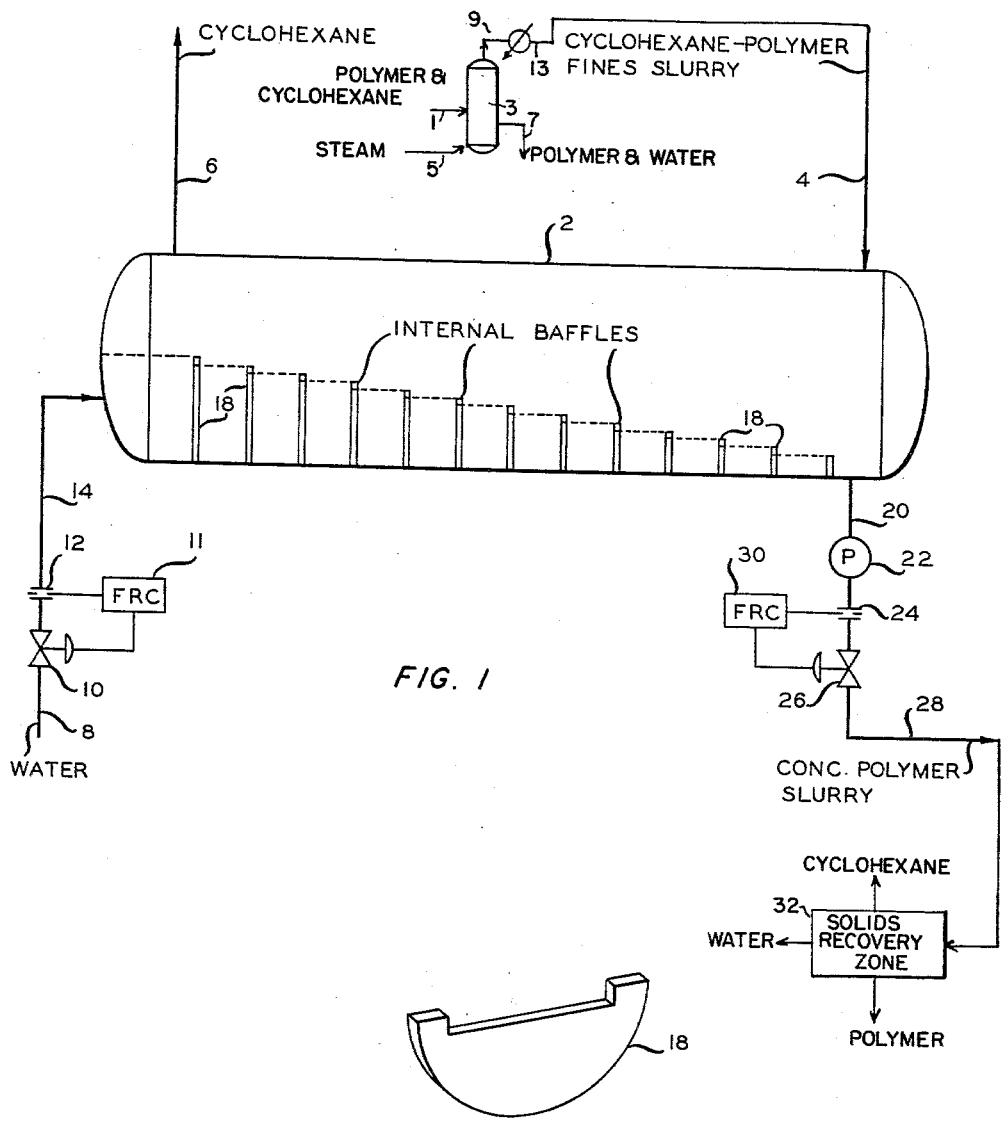
FIGURE 1 is a simplified flow diagram of a suitable settling vessel employing the method and apparatus of the invention.
FIGURE 2 is a schematic illustration of a suitable internal baffle or weir.

A stream of cyclohexane and polymer is introduced by way of line 1 into steam stripper 3. Steam is injected into steam stripper 3 through line 5 to evaporate the cyclohexane. A stream of water and the major portion of the polymer is withdrawn by way of line 7 while the evaporated cyclohexane is withdrawn by way of line 9 and passed to condenser 13. The resulting condensate containing 0.35 weight percent polymer fines in cyclohexane is introduced at the rate of 215 g.p.m. into a settling vessel 2 through conduit 4. Said settling vessel is a 10' x 40' cylindrical tank containing thirteen baffles 18 having a 3 foot spacing with a top slope of ½ inch by 3 feet with the shortest baffle being 6½ inches in height and the tallest baffle being 12½ inches in height. Each baffle contains a slot or weir in the upper edge of ¼ inch depth by 48 inches width. The substantially solids-free cyclohexane is removed from the opposite end portion of vessel 2 through conduit 6. Although the drawing illustrates the slurry being introduced in one end and the solvent being withdrawn from the other, it is to be understood that the slurry may be introduced at either end or any segment intermediate thereof irrespective of the point of introduction of the water hereinafter discussed. Water or any other fluid, such as cyclic or acyclic paraffin hydrocarbons, alcohols, aromatic hydrocarbons, e.g. toluene, xylene, and the like, which are immiscible with the diluent containing the solids at the temperature of settling and which have a specific gravity greater than either said diluent or solids so as to form an interfacial layer between the resulting two phases, is introduced into the settling vessel 2 through conduits 8, valve 10, flow sensing means 12 and conduit 14. The water is introduced at the end of the vessel containing the highest weir and at a level below the top of said weir. The volume or flow rate of the water introduced is varied by means of flow recorder controller 11 responsive to a signal from flow sensing device 12 so as to provide a substantially constant depth of fluid flow over each individual weir, preferably in the range of 0.05 to 0.15 inch. This depth, which has been found to be satisfactory for the particulate polyolefin polymer but which may vary for each individual system, should be such that there is no turbulence which may produce an emulsion but should not be so low as to tend to cause the polymer particles to lodge at the upper edge of the weir. Slots or weirs are provided in each baffle or equal dimension so as to maintain the same water height over each weir. The water flow rate can then be controlled to obtain the desired water height. By this arrangement, the horizontal plane of the interfacial layer is gradually lowered from that at the point of introduction of the water to the opposite end where the polymer solids are withdrawn. The interfacial layer containing the polymer solids is withdrawn through conduit 20, pump 22, flow sensing means 24, valve 26 and conduit 28. Flow recorder controller 30 receives a signal from flow sensing means 24 and actuates valve 26 so as to provide an additional control over the height of the interfacial layer passing over each individual weir. Five gallons per minute of cooling water at approximately 35 p.s.i.g. is introduced through conduit 8 and seven gallons per minute of slurry is withdrawn from conduit 20 in this specific embodiment. This slurry then passes to solids recovery zone 32, which can comprise any suitable means, for example a waste stripper wherein the small amount of cyclohexane, removed with the interfacial layer, is removed by evaporation and the water is removed with the solid polymer. The solid polymer may then be removed from the water for further processing or disposed of as waste.

The settling vessel is maintained at a temperature of about 100° F. Approximately 80 percent of the incoming polymer solids are removed from the slurry introduced into the settling vessel amounting to a removal of about 700 pounds per day of polymer from the cyclohexane which is then recycled.

While certain examples, structures, compositions and process steps have been described for purposes of illustration, the invention is not limited to these. Variations and modifications within the scope of the disclosure and the claims can readily be effected by those skilled in the art.

I claim:

1. In a process for the recovery of solids from a slurry of said solids in a first liquid comprising introducing said slurry into the upper portion adjacent one end portion of a settling zone wherein said solids gravitate toward the lower portion of said zone and removing substantially solids-free first liquid from the upper portion adjacent the opposite end portion, the improvement comprising introducing into said lower portion adjacent one end portion a second liquid immiscible with and having a greater specific gravity than said solids and first liquid so as to form an interfacial layer containing said solids between the resultant second liquid phase and first liquid phase, stepwise reducing the level of said interfacial layer downwardly through a series of substantially horizontal planes from a point adjacent the area of introduction of said second liquid toward a second end of said settling zone opposite the area of introduction of said second liquid to cause movement of said interfacial layer from the area of introduction of said second liquid toward said second end of said settling zone, and withdrawing said interfacial layer from the lower portion of said second end and recovering solids therefrom.

2. The process of claim 1 wherein the level of said interfacial layer is reduced by passing same over the upper end portion of at least one partition in the lower portion of said zone.

3. The process of claim 2 wherein the depth of the interfacial layer passing over said partition is in the range of 0.05 to 0.15 inch.

4. In a process for the recovery of solid olefin polymers from a slurry thereof in a liquid diluent comprising separating the major portion of the particulate solid polymer from said diluent by evaporation of said diluent and thereafter condensing said diluent, said condensed diluent containing less than 1 weight percent solid polymer fines, introducing the resultant slurry into the upper portion of a settling zone adjacent a first end portion wherein said solids gravitate toward the lower portion of said zone and removing substantially solids-free diluent from the upper portion of a second end portion opposite said first end portion, the improvement comprising introducing water into the lower portion of said second end portion so as to form an interfacial layer containing polymer solids between the resultant water phase and diluent phase, passing said interfacial layer over a plurality of partitions of decreasing height in the lower portion of said zone with the height of said partitions decreasing stepwise from a maximum adjacent the area of introduction of water to a minimum adjacent said first end portion to cause a stepwise reduction in the level of said interfacial layer through a series of substantially horizontal planes to provide movement of the entire interfacial layer with said interfacial layer having a constant height over each partition, the amount of water introduced being controlled so as to produce an interfacial layer depth over each partition in the range of 0.05 to 0.15 inch., and removing said interfacial layer from the lower portion of said first end portion and thereafter recovering said solids therefrom.

5. In a process for the recovery of solids from a slurry of said solids in a first liquid comprising introducing said slurry into the upper portion adjacent one end portion of a settling zone wherein said solids gravitate toward the lower portion of said zone and removing substantially solids-free first liquid from the upper portion adjacent the opposite end portion, the improvement comprising introducing into said lower portion adjacent one end portion a second liquid immiscible with and having a greater specific gravity than said solids and first liquid so as to form an interfacial layer containing said solids between the resultant second liquid phase and first liquid phase, stepwise reducing the level of said interfacial layer downwardly through a series of substantially horizontal planes from a point adjacent the area of introduction of said second liquid toward a second end of said settling zone opposite the area of introduction of said second liquid to cause movement of said interfacial layer from the area of introduction of said second liquid toward said second end of said settling zone, and withdrawing said interfacial layer from the lower portion of said second end.

References Cited by the Examiner

UNITED STATES PATENTS

| 2,502,953 | 4/50 | Jahnig | 209—145 |
| 2,670,078 | 2/54 | Davis | 209—172 |
| 2,744,627 | 5/56 | Erck | 209—172.5 |
| 3,032,545 | 5/62 | Renberg | 260—94.9 |

FOREIGN PATENTS 412,634   5/10   France.

JOSEPH L. SCHOFER, *Primary Examiner.*